United States Patent
Horner (10) Patent No.: US 6,742,339 B2
(45) Date of Patent: Jun. 1, 2004

(54) METHODS AND APPARATUS FOR EXHAUSTING GASES FROM GAS TURBINE ENGINES

(75) Inventor: Michael W. Horner, West Chester, OH (US)

(73) Assignee: General Electric Company, Schenectady, NY (US)

(*) Notice: Subject to any disclaimer, the term of this patent is extended or adjusted under 35 U.S.C. 154(b) by 49 days.

(21) Appl. No.: 10/236,600

(22) Filed: Sep. 6, 2002

(65) Prior Publication Data

US 2004/0045271 A1 Mar. 11, 2004

(51) Int. Cl.⁷ .............................. F02C 6/20; F02C 7/18
(52) U.S. Cl. ........................................... 60/772; 60/39.5
(58) Field of Search ........................ 60/772, 796, 797, 60/798, 39.5; 181/218, 200, 204, 206, 220

(56) References Cited

U.S. PATENT DOCUMENTS

| | | | |
|---|---|---|---|
| 2,404,275 A | 7/1946 | Clark et al. | |
| 2,474,068 A | 6/1949 | Sammons et al. | |
| 2,670,597 A | 3/1954 | Villemejane | |
| 3,462,949 A | * 8/1969 | Anderson et al. | 60/796 |
| 4,002,024 A | 1/1977 | Nye et al. | |
| 4,007,587 A | 2/1977 | Banthin et al. | |
| 4,018,046 A | 4/1977 | Hurley | |
| 4,029,035 A | 6/1977 | German | |
| 4,069,668 A | * 1/1978 | Oldberg | 60/317 |
| 4,095,417 A | 6/1978 | Banthin | |
| 4,303,035 A | * 12/1981 | Burns | 114/187 |
| 4,312,480 A | 1/1982 | Miller | |
| 4,313,300 A | 2/1982 | Wilkes et al. | |
| 4,355,507 A | 10/1982 | Coffey et al. | |
| 4,528,811 A | 7/1985 | Stahl | |
| 4,747,467 A | * 5/1988 | Lyon et al. | 181/220 |
| 4,800,715 A | 1/1989 | Conway | |
| 4,864,819 A | 9/1989 | Steyer | |
| 4,993,314 A | * 2/1991 | Braden et al. | 239/127.3 |
| 5,232,385 A | 8/1993 | Hatfield | |
| 5,297,517 A | * 3/1994 | Brandt et al. | 181/204 |
| 5,731,687 A | * 3/1998 | Hirano et al. | 181/204 |
| 5,992,140 A | 11/1999 | Hammond et al. | |
| 6,010,379 A | 1/2000 | Baumann | |
| 6,055,804 A | 5/2000 | Hammond et al. | |
| 6,122,907 A | 9/2000 | Frawley | |
| 6,134,876 A | 10/2000 | Hines et al. | |
| 6,134,878 A | * 10/2000 | Amako et al. | 60/801 |
| 6,358,109 B1 | * 3/2002 | Neisen | 440/89 R |
| 6,412,284 B1 | 7/2002 | Horner | |
| 6,537,490 B2 | * 3/2003 | Han | 181/224 |

OTHER PUBLICATIONS

Naval IRSS Systems, David Engineering, published Jul. 30, 2002.

* cited by examiner

Primary Examiner—Ted Kim
(74) Attorney, Agent, or Firm—Nathan D. Herkamp; Armstrong Teasdale LLP; Robert B. Reeser, III (57) ABSTRACT

A method enables a gas turbine engine positioned within a module to be operated. The engine includes an inlet and an exhaust, and the module includes an inlet area, an exhaust area, and an engine area extending therebetween and housing the engine. The exhaust area includes an exhaust duct and an outlet. The engine is operated such that inlet air is routed through the module inlet and into the engine inlet, wherein exhaust gases are discharged through the module exhaust duct and substantially perpendicularly from the gas turbine engine. The exhaust gases are discharged from the module outlet in a direction that is at least ninety degrees offset from exhaust gases flowing within the exhaust duct. Cooling fluid is discharged from the module engine area through a cooling system exhaust, such that the discharged fluid flows through the cooling system exhaust and around the module exhaust area.

20 Claims, 6 Drawing Sheets

METHODS AND APPARATUS FOR EXHAUSTING GASES FROM GAS TURBINE ENGINES

BACKGROUND OF THE INVENTION

This invention relates generally to gas turbine engines, and more specifically to methods and apparatus for exhausting gases from gas turbine engines.

Gas turbine engines are used as a power source within a variety of applications. To protect the engine from the environment, and to shield a surrounding structure from the gas turbine engine, the gas turbine engine may be mounted within a module that includes an inlet area, an exhaust area, and an engine area that extends between the inlet area and the exhaust area. For example, when the gas turbine engine is used as a power source for a ship including a superstructure, the engine may be located within the hull near the waterline in a position that is outboard of the superstructure, but inboard of the superstructure external sidewall. Such an engine location facilitates reducing noise and heat generated during engine operation, while providing a secure mounting platform.

Because engines require continuous airflow for operation, within at least some known modules, the module inlet and exhaust areas include ducts to route ambient air from outside the hull to the engine, and to channel exhaust gases produced during operation of the engine from the hull, respectively. To reduce a risk of water inadvertently entering or blocking an entrance or exhaust to the module inlet ducts, the module inlet ducts and exhaust ducts are routed to emerge from the hull at elevations that are considerably higher than elevations where water typically contacts the hull. More specifically, the exhaust ducts are generally routed such that the exhaust gases are discharged upwardly adjacent the superstructure.

However, the exhaust duct area of gas turbine engines is a source of high infrared energy which may be used for targeting/tracking purposes by heat seeking missiles and/or various forms of infrared imaging systems. To facilitate reducing an infrared signature of a gas turbine engine, at least some known ships use exhaust as systems which cool exhaust gases by injecting sea water into the exhaust gas stream. Other known ships use suppressors which permit cooling air to mix with the exhaust gas stream through concentric rings surrounding the exhaust duct. In at least some other known ships, the exhaust gases are routed through a series of exhaust baffles prior to being discharged to the atmosphere. Generally, any benefits gained by such systems may be offset by losses created in acquiring the reduced infrared signature. More specifically, when the exhaust gases are cooled by cooling air, the air is generally provided at a substantial engine power loss or weight penalty. Furthermore, in other known systems, the benefits gained by such systems may be offset by comparatively large installation space requirements, complex ducting, and/ or substantial weight penalties.

BRIEF SUMMARY OF THE INVENTION

In an exemplary embodiment, a method for operating a gas turbine engine positioned within a module is provided. The engine includes an inlet and an exhaust, and the module includes an inlet area, an exhaust area, and an engine area extending therebetween and housing the engine. The exhaust area includes an exhaust duct and an outlet. The method comprises operating the engine such that inlet air is routed through the module inlet and into the engine inlet, discharging exhaust gases from the engine through the module exhaust duct such that the exhaust gases are routed substantially perpendicularly from the gas turbine engine, discharging exhaust gases from the module outlet such that the exhaust gases are discharged in a direction that is at least ninety degrees offset from exhaust gases flowing with in the exhaust duct, and supplying cooling fluid to the module engine area through a cooling system inlet. The method also comprises discharging cooling fluid from the module engine are a through a cooling system exhaust, such that the cooling fluid discharged from the engine area flows through the cooling system exhaust and around the module exhaust area disposed within the cooling system exhaust.

In another aspect, a gas turbine engine assembly is provided. The assembly comprises a module, a gas turbine engine, and a cooling system. The module comprises an inlet area, an engine area, and an exhaust area, wherein the engine area extends between the inlet and exhaust areas to define a cavity. The module exhaust area comprises an exhaust duct and an outlet extending in flow communication from the exhaust duct. The gas turbine engine is within the module cavity, and comprises an inlet and an exhaust. The turbine engine exhaust is adjacent the module exhaust area, and the module exhaust duct is used for routing exhaust gases discharged from the gas turbine engine exhaust substantially perpendicularly from the gas turbine engine. The exhaust area outlet is for routing exhaust gases discharged from the exhaust duct in direction that is at least ninety degrees offset with respect to exhaust gases flowing within the exhaust duct. The cooling system comprises an inlet and an exhaust. The inlet is for supplying cooling fluid into the module engine area external to the gas turbine engine. The cooling system exhaust is for discharging cooling fluid from the module engine area. The module exhaust area is concentrically disposed within the cooling system exhaust.

In a further aspect of the invention, an exhaust system for a gas turbine engine having an inlet and an exhaust is provided. The exhaust system comprises a module and a cooling system. The module comprises an inlet area, an exhaust area, and an engine area that extends therebetween. The engine is disposed within the module engine area such that the engine exhaust is in flow communication with the module exhaust area. The module exhaust area comprises an exhaust duct and an outlet, wherein the exhaust duct is for routing exhaust gases discharged from the engine exhaust substantially perpendicularly from the gas turbine engine, and the exhaust area outlet is for routing exhaust gases discharged from the exhaust duct in a direction that is at least ninety degrees offset from exhaust gases flowing through said exhaust duct. The cooling system comprises an inlet and an exhaust. The inlet is coupled to the module engine area for routing cooling fluid into the module engine area. The cooling system exhaust is coupled to the module engine area for routing cooling fluid from the module engine area. The module exhaust area is concentrically aligned within the cooling system exhaust.

DETAILED DESCRIPTION OF THE INVENTION

Figure 1:
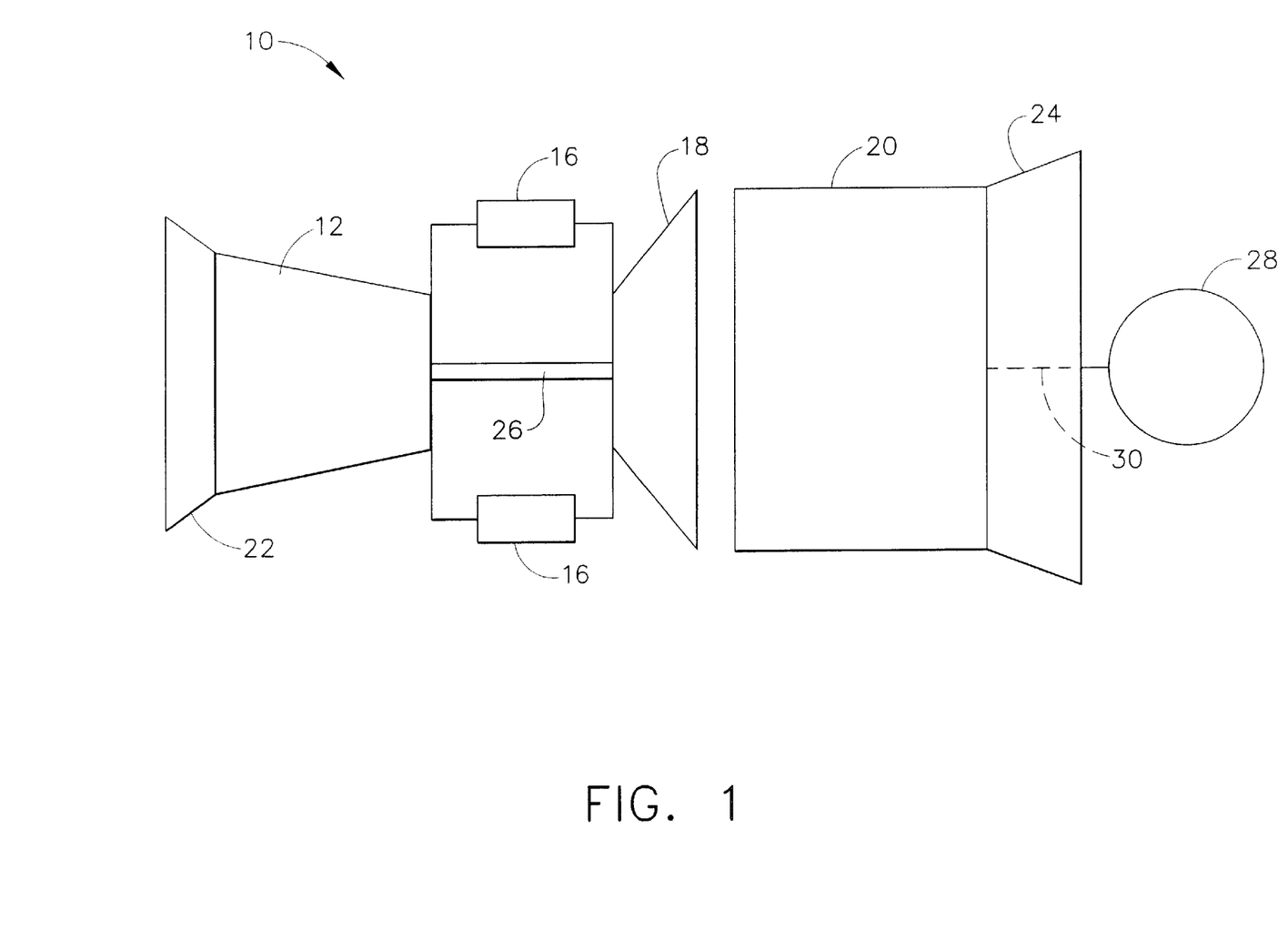
FIG. 1 is a schematic illustration of a gas turbine engine.

FIG. 1 is a schematic illustration of a gas turbine engine 10 including at least one compressor 12, a combustor 16, a high pressure turbine 18, a low pressure turbine 20, an inlet 22, and an exhaust nozzle 24 connected serially. In one embodiment, engine 10 is an LM2500 engine commercially available from General Electric Company, Cincinnati, Ohio. Compressor 12 and turbine 18 are coupled by a first shaft 26, and turbine 20 and a driven load 28 are coupled by a second shaft 30.

In operation, air flows into engine inlet 22 through compressor 12 and is compressed. The compressed air is then delivered to combustor 16 where it is mixed with fuel and ignited. Airflow from combustor 16 drives rotating turbines 18 and 20 and exits gas turbine engine 10 through exhaust nozzle 24.

Figure 2:
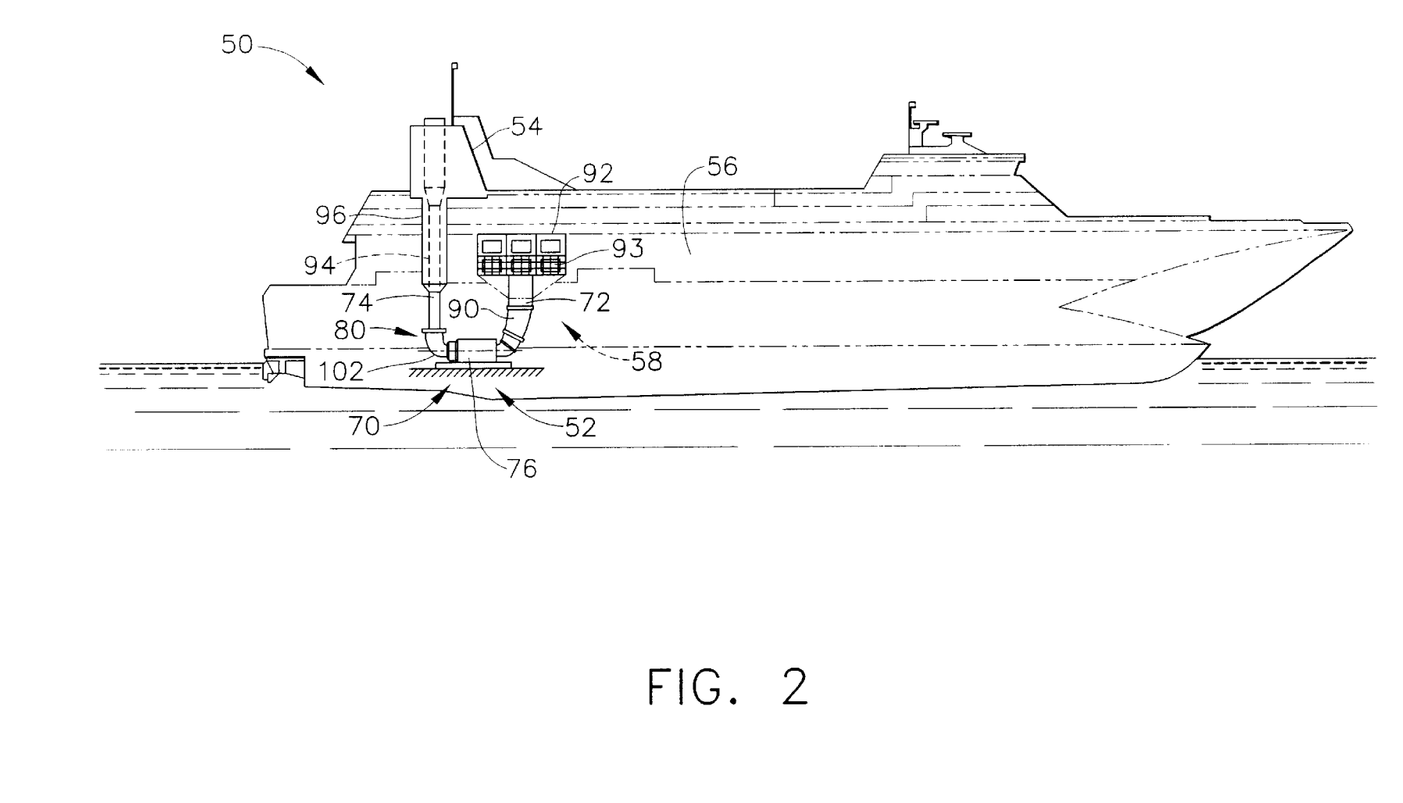
FIG. 2 is a partial cross-sectional side view of a ship including a gas turbine engine assembly.

FIG. 2 is a partial cross-sectional side view of a ship 50 including a known gas turbine engine assembly 52. The overall architecture of ship 50 includes a superstructure 54 that extends upwardly from a hull 56. Hull 56 defines a cavity 58 that houses gas turbine engine assembly 52.

Gas turbine engine assembly 52 includes a module 70 that may be used with a gas turbine engine similar to engine 10 (shown in FIG. 1). Module 70 includes an inlet area 72, an exhaust area 74, and an engine area 76 that extends between inlet and exhaust areas 72 and 74, respectively.

Module engine area 76 extends between module inlet area 72 and module exhaust area 74. Engine area 76 defines a cavity 80 sized to receive engine 10 therein. Engine 10 is mounted within module engine area cavity 80 such that engine inlet 22 (shown in FIG. 1) is adjacent module inlet area 72, and engine exhaust nozzle 24 (shown in FIG. 1) is adjacent module exhaust area 74. In the exemplary embodiment, inlet area 72 and exhaust area 74 extend substantially perpendicularly from module engine area 76.

Module inlet area 72 includes an inlet duct 90 attached in flow communication between module engine area 76 and a structure entrance inlet 92 to receive ambient airflow therethrough. In the exemplary embodiment, inlet duct 90 is coupled to a moisture separator assembly 93 that facilitates removing moisture and preventing moisture from being channeled to module engine area 76 and engine 10 through inlet duct 90.

Module exhaust area 74 includes an exhaust duct 94 positioned within a cooling system 96. More specifically, exhaust duct 94 is positioned concentrically within a cooling system exhaust duct 100 that extends around exhaust duct 94 such that duct 94 is radially inward from cooling system exhaust duct 100.

Exhaust duct 94 and cooling system exhaust duct 100 are routed upwardly from module engine area 76 along superstructure 54. More specifically, exhaust duct 94 includes an exhaust collector 102 that is coupled to gas turbine engine exhaust nozzle 24 between engine exhaust nozzle 24 and exhaust duct 94. Exhaust flow discharged from engine 10 is collected in exhaust collector 102 prior to entering exhaust duct 94. More specifically, exhaust gases are only routed into exhaust duct 94 and are not channeled into cooling system exhaust duct 100. Rather, cooling system exhaust duct 100 routes air supplied to engine area 76 from inlet area 72 to the atmosphere. Furthermore, exhaust collector 102 enables gases discharged from engine 10 to be channeled in a direction that is substantially perpendicularly away from engine 10 with respect to a centerline of engine 10. In one embodiment, exhaust duct 94 and cooling system exhaust duct 100 are routed to an elevation above where waves could impinge and enter either exhaust duct 94 or 100. Accordingly, exhaust gases discharged from exhaust duct 94 and cooling air discharged from exhaust duct 100 is discharged upwardly into the atmosphere.

Figure 3:
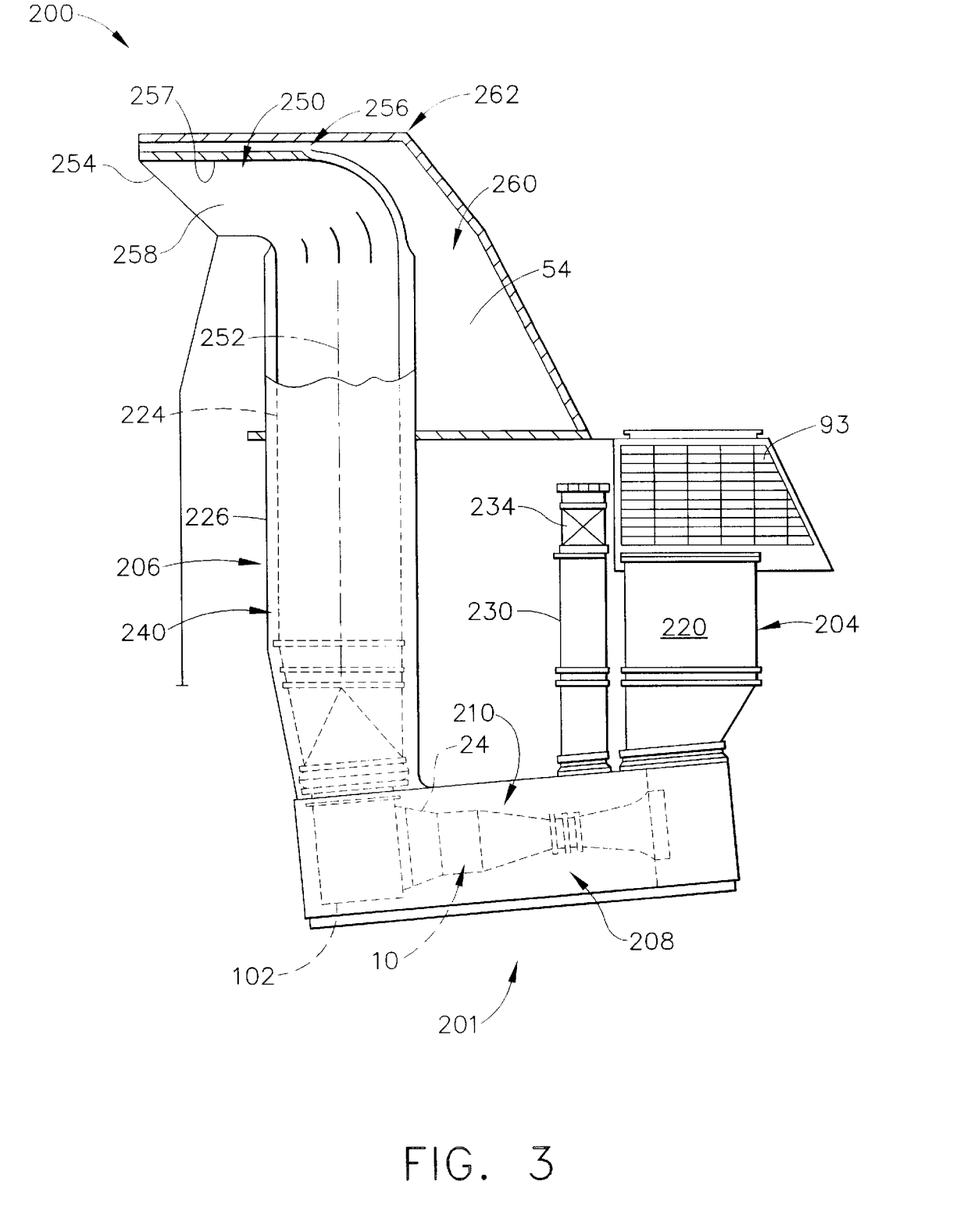
FIG. 3 is a cross sectional view of a gas turbine assembly that may be used with the ship shown in FIG. 2.

FIG. 3 is a cross sectional view of a gas turbine assembly 200 that may be used with a ship, such as ship 50 (shown in FIG. 2). Turbine assembly 200 is substantially similar to turbine assembly 52 shown in FIG. 1 and components in assembly 200 that are identical to components of assembly 52 are identified in FIG. 3 using the same reference numerals used in FIG. 2. Accordingly, turbine assembly 200 includes a module 201 that is substantially similar to module 70 shown in FIG. 2, a gas turbine engine, such as engine 10 and a cooling system 202. Module 201 includes an inlet area 204, an exhaust area 206, and an engine area 208 that extends between inlet and exhaust areas 204 and 206, respectively.

Module engine area 208 extends between module inlet area 204 and module exhaust area 206, and defines a cavity 210 sized to receive engine 10 therein. Engine 10 is mounted within module engine area cavity 210 such that engine inlet 22 is adjacent module inlet area 204, and engine exhaust nozzle 24 is adjacent module exhaust area 206. In the exemplary embodiment, inlet area 204 and exhaust area 206 extend substantially perpendicularly from module engine area 208.

Module inlet area 204 includes an inlet duct 220 attached in flow communication between engine 10 and structure entrance inlet 92 to receive ambient airflow therethrough. In the exemplary embodiment, inlet duct 220 is coupled to moisture separator assembly 93 to facilitate removing and preventing moisture from being channeled to engine 10 through inlet duct 220.

Module exhaust area 206 includes an engine exhaust duct 224 positioned within cooling system 202. More specifically, exhaust duct 224 is positioned concentrically within a cooling system exhaust duct 226 that extends around engine exhaust duct 224, such that duct 224 is radially inward from cooling system exhaust duct 226. Exhaust duct 224 and cooling system exhaust duct 226 are routed upwardly from engine 10 and module engine area 208 along superstructure 54. More specifically, exhaust duct 224 is coupled to exhaust collector 102 which is inturn coupled to gas turbine engine exhaust nozzle 24 such that exhaust gases discharged from engine 10 are channeled into engine exhaust duct 224. Accordingly, exhaust flow discharged from engine 10 is collected in exhaust collector 102 prior to entering exhaust duct 224 and is not channeled into cooling system exhaust duct 226, as is described in more detail below. More specifically, engine exhaust collector 102 facilitates channeling engine exhaust flow into engine exhaust duct 224 such that the exhaust gases are channeled substantially perpendicularly from engine 10 with respect to an engine axis of symmetry.

Cooling system exhaust duct 226 is coupled in flow communication to an inlet duct 230 and module engine area 208. Specifically, in the exemplary embodiment, cooling system inlet duct 230 is routed along module inlet area 204 for supplying cooling air to module engine area 208 for external cooling of engine 10. More specifically, module engine area 208 is partitioned from engine inlet duct 220 such that airflow channeled through module inlet duct 220 is directed only into engine inlet 22 for combustion, and is not supplied to module engine area 208. In an alternative embodiment, module engine area 208 includes a plurality of louvers (not shown) that are selectively operable to provide flow communication between module engine area 208 and module inlet area 204. In another alternative embodiment, module engine area 208 includes a plurality of spring-loaded blow-in doors (not shown) to provide flow communication between module engine area 208 and module inlet area 204.

Cooling system inlet duct 230 includes a cooling fan 234 that forces air drawn through moisture separators 73 into module engine area 208 for external cooling of engine 10. In an alternative embodiment, inlet duct 230 does not include fan 234. In a further alternative embodiment, cooling system inlet duct 230 is not coupled in flow communication with moisture separators 93 and receives cooling air from an alternative source. In a further alternative embodiment, cooling system inlet duct 230 routes cooling fluids other than air to module engine area 208.

Cooling system exhaust duct 226 is spaced radially outwardly from engine exhaust duct 224 such that a cooling passage 240 is defined therebetween. Cooling passage 240 facilitates convective cooling of engine exhaust duct 224 to facilitate reducing an infrared heat signature of exhaust duct 224 from sea level observation. In the exemplary embodiment, cooling system exhaust duct 226 extends along engine exhaust duct 224 from engine 10 to a module exhaust outlet 250.

Exhaust outlet 250 facilitates discharging exhaust gases from engine exhaust duct 224 in a direction that is offset at least ninety degrees with respect to exhaust gases flowing within engine exhaust duct 224. Specifically, in the exemplary embodiment, exhaust outlet 250 routes exhaust flow from engine duct 224 aftward in a direction that is substantially perpendicular with respect to a centerline axis 252 extending through exhaust duct 224. In an alternative embodiment, exhaust outlet 250 is routed to exhaust flow from engine duct 224 in a direction that is greater than ninety degrees with respect to centerline axis 252.

A trailing edge 254 of exhaust outlet 250 is substantially rectangular and is angled to facilitate channeling the exhaust flow aftward from ship 50 and towards the water. In an alternative embodiment, exhaust outlet trailing edge 254 is non-rectangular. To facilitate preventing the exhaust flow from increasing a temperature of exhaust outlet 250, at least a portion 256 of exhaust outlet 250 is insulated. In another embodiment, a radially outer surface 257 and each sidewall 258 of exhaust outlet 250 are insulated.

Cooling air discharged from module engine area 208 is also discharged in an aftward direction from cooling system exhaust duct 226 to facilitate mixing between the discharged cooling air and the discharged engine exhaust flow. Such mixing facilitates reducing a temperature of the exhaust flow downstream from exhaust outlet 250. In addition, purge air is routed through a cooling passage 260 defined within an insulated portion 262 of superstructure 54 that is adjacent engine exhaust 224 and exhaust outlet 250. The purge air is mixed with the cooling airflow discharged from cooling system exhaust duct 226 prior to being discharged aftward for mixing with discharged engine exhaust flow. In an alternative embodiment, purge air is not routed through a portion of superstructure 54.

During operation, air is supplied to gas turbine engine 10 for combustion through module inlet area 204, and cooling air is supplied to module engine area 208 for external cooling of engine 10 through cooling system inlet duct 230. Engine exhaust flow is discharged from engine 10 through exhaust collector 102 wherein the exhaust flow is channeled substantially perpendicularly from engine 10 by engine exhaust duct 224. Furthermore, cooling air discharged from module engine area 208 is through cooling system exhaust duct 226 and around engine exhaust duct 224 prior to being discharged aftward adjacent exhaust outlet 250. The discharged cooling air and the purge air mix with discharged engine exhaust to facilitate reducing the temperature of the engine exhaust, thus reducing an infrared signature of engine 10.

Figure 4:
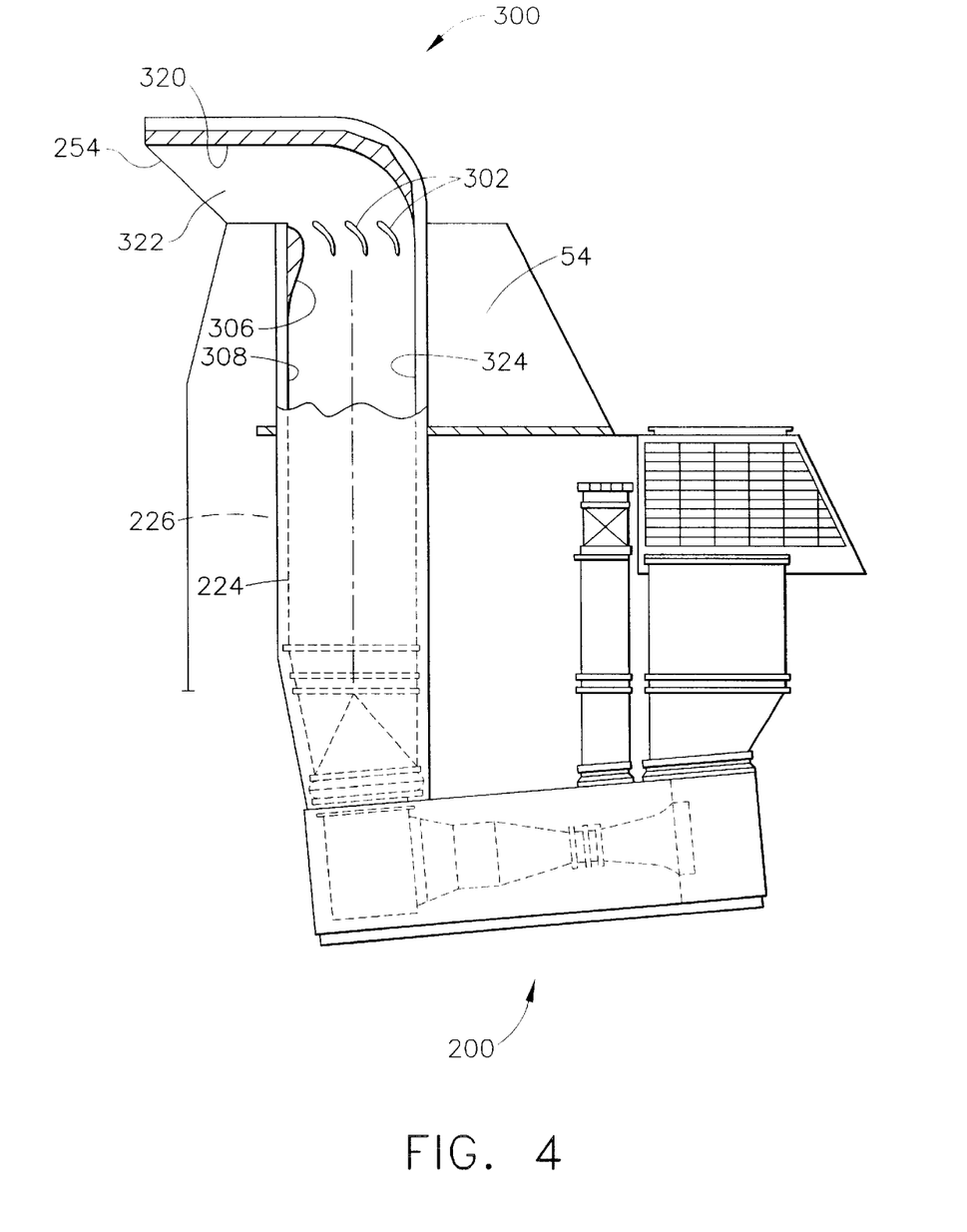
FIG. 4 is a cross sectional view of an alternative embodiment of an exhaust outlet that may be used with the gas turbine assembly shown in FIG. 3.

FIG. 4 is a cross sectional view of an alternative embodiment of an exhaust outlet 300 that may be used with turbine assembly 200. Exhaust outlet 300 is substantially similar to exhaust outlet 250 shown in FIG. 3 and components in exhaust outlet 300 that are identical to components of exhaust outlet 250 are identified in FIG. 4 using the same reference numerals used in FIG. 3. Exhaust outlet 300 includes a plurality of mechanical devices 302 which facilitate channeling exhaust gases flowing within exhaust duct 224 into exhaust outlet 300. In the exemplary embodiment, devices 302 are turning vanes which extend through exhaust duct 224 to facilitate reducing pressure losses as the exhaust flow changes direction.

Additionally, exhaust duct 224 includes an insulated shoulder 306 which extends radially from an aft wall 308 of exhaust duct 224 into the exhaust flow path within exhaust duct 224. More specifically, shoulder 306 is positioned adjacent turning vanes 302 and facilitates channeling the exhaust flow through vanes 302 while reducing pressure losses as the exhaust flow changes direction.

Exhaust outlet 300 is insulated to facilitate reducing operating temperatures of exhaust outlet 300 and superstructure 54. Specifically, a radially outer wall 320 and each sidewall 322 defining exhaust outlet 300 is insulated. More specifically, exhaust outlet outer wall 320 is insulated from trailing edge 254 to a forward wall 324 of exhaust duct 224. In an alternative embodiment, exhaust outlet outer wall 320 includes a plurality of heat transfer devices (not shown), such as, but not limited to cooling pins, fins, ribs, dimples, or corrugations used to facilitate increasing convective cooling of exhaust outlet 300 and to facilitate reducing an infrared heat signature of engine 10 from sea level or overhead observation.

Figure 5:
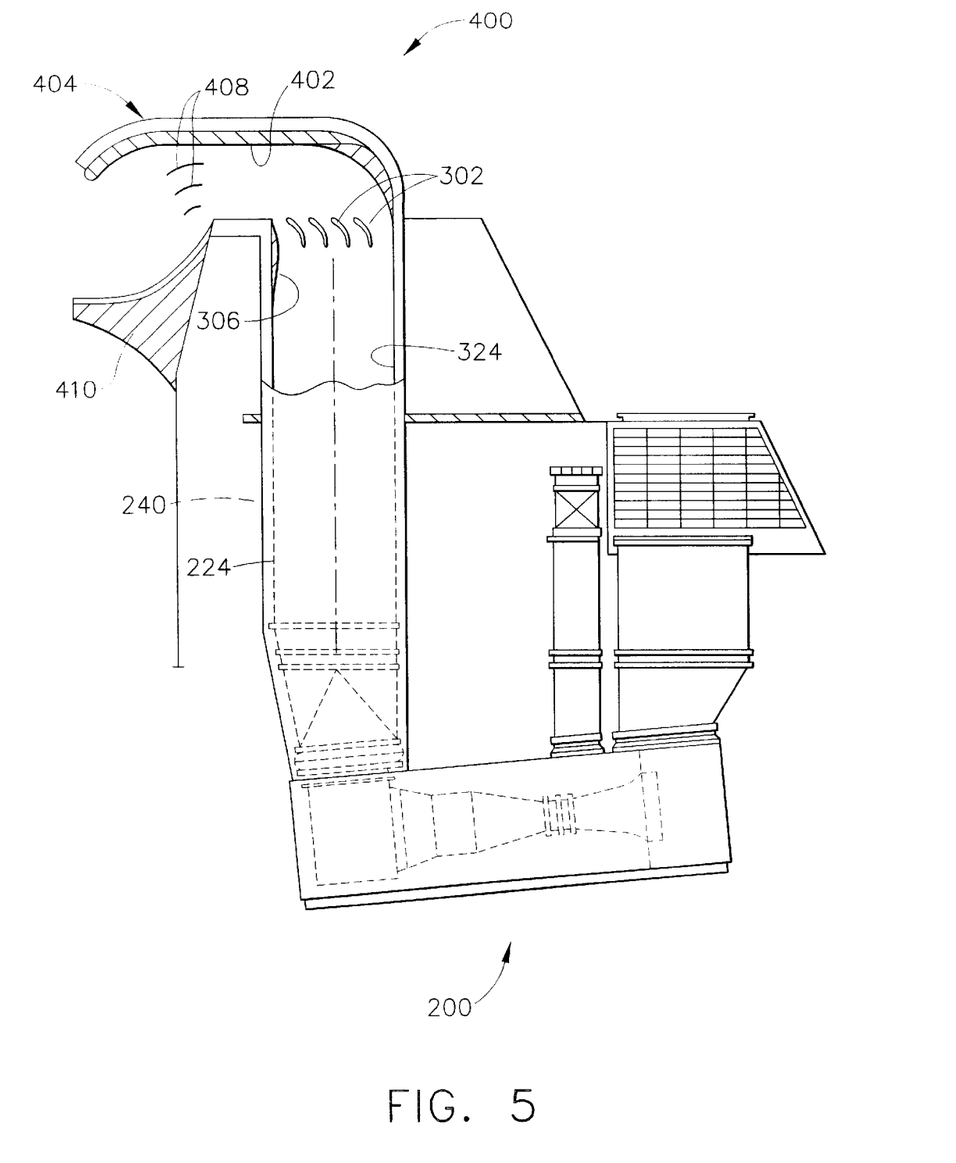
FIG. 5 is a cross sectional view of a further alternative embodiment of an exhaust outlet that may be used with the gas turbine assembly shown in FIG. 3.

FIG. 5 is a cross sectional view of an alternative embodiment of an exhaust outlet 400 that may be used with turbine assembly 200. Exhaust outlet 400 is substantially similar to exhaust outlets 250 and 300 shown in FIGS. 3 and 4, respectively, and components in exhaust outlet 400 that are identical to components of exhaust outlets 250 and 300 are identified in FIG. 4 using the same reference numerals used in FIGS. 3 and 4. Exhaust outlet 400 includes a radially outer wall 402 that is extended a greater distance from exhaust duct centerline 252 in comparison to outer wall 320 (shown in FIG. 4) to form a hood 404. Hood 404 facilitates directing exhaust gases flowing through exhaust outlet 400 and discharged cooling air towards the waterline. Furthermore, exhaust outlet hood 400 also prevents a direct view of exhaust duct forward wall 324, which further facilitates reducing an infrared heat signature of exhaust duct 224 from sea level observation. In the exemplary embodiment, hood 404 includes additional mechanical devices 408 which are similar to devices 302 and which facilitate channeling exhaust gases flowing through outlet 400 into hood 404.

Additionally, exhaust outlet 400 includes a deflector 410 which channels exhaust flow discharged through hood 404 aftward. In one embodiment, exhaust outlet 400 does not include deflector 410. Deflector 410 is cooled by using cooling air routed through duct 240.

Figure 6:
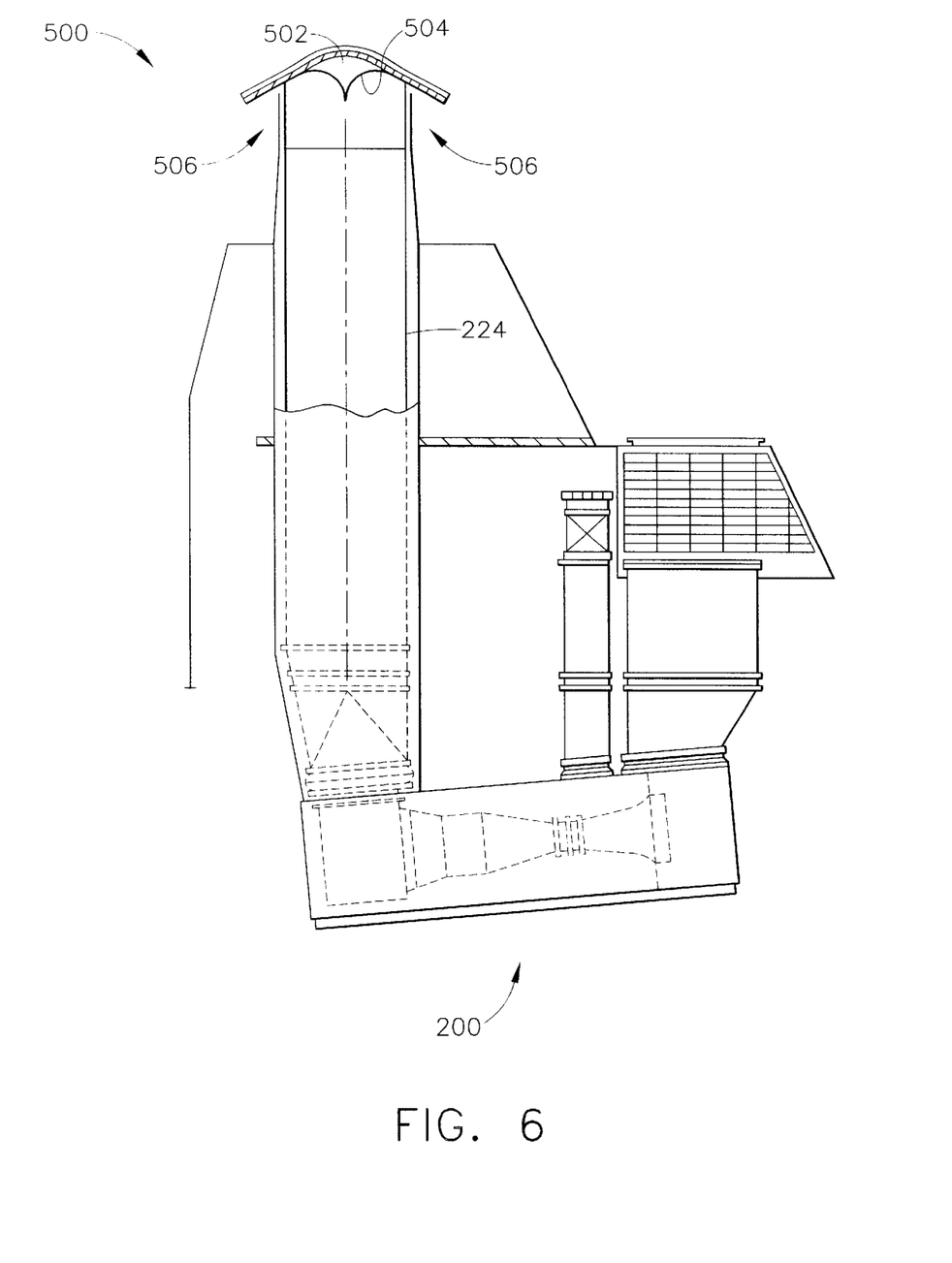
FIG. 6 is a cross sectional view of another alternative embodiment of an exhaust outlet that may be used with the turbine assembly shown in FIG. 3.

FIG. 6 is a cross sectional view of an alternative embodiment of an exhaust outlet 500 that may be used with turbine assembly 200. Exhaust outlet 500 includes a hood 502 and a splitter 504 that facilitate discharging exhaust gases from engine exhaust duct 224 in a direction that is offset at least ninety degrees with respect to exhaust gases flowing within engine exhaust duct 224. Specifically, in the exemplary embodiment, hood 502 extends across engine exhaust duct 224 to prevent exhaust flow discharged from exhaust duct 224 from continuing in the same upwardly direction of travel. More specifically, splitter 504 extends radially from hood 502 into exhaust duct 224 to define flow passages 506 for exhaust flow discharged from exhaust duct 224. Flow passages 506 channel exhaust flow discharged from exhaust duct 224 in a direction that is offset at least ninety degrees with respect to exhaust duct centerline 252. In one embodiment, flow passages 506 extend accurately around exhaust duct 224. In another embodiment, hood 502 is coupled a distance from exhaust duct 224 and splitter 504 channels exhaust flow in substantially 360° of travel when discharged from exhaust duct 224.

To facilitate reducing pressure losses as the exhaust gases are redirected prior to being discharged to the atmosphere, in one embodiment, exhaust duct 224 includes a plurality of turning vanes 302 (shown in FIG. 4) upstream from splitter 504. In another embodiment, exhaust duct 224 includes at least one insulated shoulder 306 (shown in FIG. 4) upstream from splitter 504. In yet another embodiment, a direction of travel of exhaust gases discharged from outlet 500 is changed by at least one deflector 410 (shown in FIG. 5).

The above-described gas turbine engine assemblies are cost-effective and highly reliable. Each assembly includes a cooling system that exhausts cooling air separately from engine exhaust gases, and such that the exhaust gases and cooling air discharged from each assembly is discharged in a direction that is offset at least ninety degrees from the exhaust gases flowing within the exhaust duct. Furthermore, the engine exhaust duct is routed concentrically within the cooling system exhaust to facilitate additional convective cooling. As a result, the cooling system facilitates reducing an infrared signature of the engine in a cost-effective and reliable manner.

Exemplary embodiments of gas turbine assemblies are described above in detail. The assemblies are not limited to the specific embodiments described herein, but rather, components of each assembly may be utilized independently and separately from other components described herein. Each gas turbine engine assembly component can also be used in combination with other gas turbine engine assembly components.

While the invention has been described in terms of various specific embodiments, those skilled in the art will recognize that the invention can be practiced with modification within the spirit and scope of the claims.

What is claimed is:

1. A method for operating a gas turbine engine positioned within a module, the engine including an inlet and an exhaust, the module including an inlet area, an exhaust area, and an engine area extending therebetween and housing the engine, the exhaust area including an exhaust duct and an outlet, said method comprising:

operating the engine such that inlet air is routed through the module inlet and into the engine inlet;

discharging exhaust gases from the engine through the module exhaust duct such that the exhaust gases are routed substantially perpendicularly from the gas turbine engine;

discharging exhaust gases from the module outlet such that the exhaust gases are discharged in a direction that is at least ninety degrees offset from exhaust gases flowing within the exhaust duct;

supplying cooling fluid to the module engine area through a cooling system inlet; and discharging cooling fluid from the module engine area through a cooling system exhaust, such that the discharged cooling fluid flows through the cooling system exhaust and around the module exhaust area disposed within the cooling system exhaust.

2. A method in accordance with claim 1 wherein discharging cooling fluid from the module engine area further comprises discharging cooling fluid from the module engine area to facilitate suppressing an exhaust infrared signature of the gas turbine engine.

3. A method in accordance with claim 2 wherein discharging exhaust gases from the engine through the module exhaust duct further comprises changing a direction of the flow of the exhaust gases by using at least one of a splitter and turning vanes.

4. A method in accordance with claim 2 wherein discharging exhaust gases from the engine through the module exhaust duct further comprises changing a direction of the flow of the exhaust gases without accelerating the exhaust flow.

5. A method in accordance with claim 2 wherein discharging exhaust gases from the engine through the module exhaust duct further comprises discharging exhaust gases from the engine through an insulated exhaust duct to facilitate reducing heat transfer between the exhaust duct and the cooling system exhaust.

6. A gas turbine engine assembly comprising:

a module comprising an inlet area, an engine area, and an exhaust area, said engine area extending between said inlet and exhaust areas to define a cavity, said module exhaust area comprising an exhaust duct and an outlet extending in flow communication from said exhaust duct;

a gas turbine engine within said module cavity, said engine comprising an inlet and an exhaust, said turbine engine exhaust adjacent said module exhaust area, said module exhaust duct for routing exhaust gases discharged from said gas turbine engine exhaust substantially perpendicularly from said gas turbine engine, said exhaust area outlet for routing exhaust gases discharged from said exhaust duct in direction that is at least ninety degrees offset with respect to exhaust gases flowing within said exhaust duct; and a cooling system comprising an inlet and an exhaust, said inlet for supplying cooling fluid into said module engine area external said gas turbine engine, said cooling system exhaust for discharging cooling fluid from said module engine area, said module exhaust area concentrically disposed within said cooling system exhaust.

7. A gas turbine assembly in accordance with claim 6 wherein said module exhaust area and said cooling system configured to facilitate suppressing an exhaust infrared signature of said gas turbine engine.

8. A gas turbine assembly in accordance with claim 7 wherein said module exhaust duct further comprises a plurality of turning vanes for routing exhaust gases flowing therein towards said module exhaust area outlet.

9. A gas turbine assembly in accordance with claim 7 wherein said module exhaust area outlet further comprises a hood extending across said module exhaust duct, said hood comprising a splitter configured to discharge exhaust gases from said exhaust duct in at least two different directions.

10. A gas turbine assembly in accordance with claim 7 wherein said module exhaust area outlet further comprises a hood extending across said module exhaust duct, said hood comprising a splitter configured to discharge exhaust gases radially outward and circumferentially from said exhaust duct.

11. A gas turbine assembly in accordance with claim 7 wherein said module exhaust area outlet configured to route exhaust gases discharged from said exhaust duct without accelerating the exhaust gases.

12. A gas turbine assembly in accordance with claim 7 wherein said module exhaust duct comprises insulated walls.

13. An exhaust system for a gas turbine engine having an inlet and an exhaust, said exhaust system comprising:

a module comprising an inlet area, an exhaust area, and an engine area extending therebetween, the engine disposed within said module engine area such that the engine exhaust is in flow communication with said module exhaust area, said module exhaust area comprising an exhaust duct and an outlet, said exhaust duct for routing exhaust gases discharged from said engine exhaust substantially perpendicularly from the gas turbine engine, said exhaust area outlet for routing exhaust gases discharged from the exhaust duct in a direction that is at least ninety degrees offset from exhaust gases flowing through said exhaust duct; and a cooling system comprising an inlet and an exhaust, said inlet coupled to said module engine area for routing cooling fluid into said module engine area, said cooling system exhaust coupled to said module engine area for routing cooling fluid from said module engine area, said module exhaust area concentrically aligned within said cooling system exhaust.

14. An engine exhaust system in accordance with claim 13 wherein said module exhaust area and said cooling system configured to facilitate suppressing an exhaust infrared signature of the gas turbine engine.

15. An engine exhaust system in accordance with claim 13 wherein said module exhaust duct further comprises a plurality of turning vanes for routing exhaust gases flowing therein towards said module exhaust area outlet.

16. An engine exhaust system in accordance with claim 13 wherein at least a portion of said module exhaust duct is insulated to facilitate reducing heat transfer from said exhaust duct to said cooling system exhaust.

17. An engine exhaust system in accordance with claim 13 wherein said module exhaust area outlet comprises a hood extending across said exhaust duct, said hood defining a plurality of passageways for channeling exhaust gases discharged from said exhaust duct radially outwardly from said exhaust duct in at least two different directions.

18. An engine exhaust system in accordance with claim 13 wherein said module exhaust area outlet comprises a hood extending across said exhaust duct, said hood configured to circumferentially discharge exhaust gases from said exhaust duct.

19. An engine exhaust system in accordance with claim 13 wherein said module exhaust area outlet has a substantially rectangular cross-sectional profile.

20. An engine exhaust system in accordance with claim 19 wherein said module exhaust duct has a substantially circular cross-sectional profile.

* * * * *